United States Patent [19]

Aso et al.

[11] Patent Number: 4,992,854
[45] Date of Patent: Feb. 12, 1991

[54] VIDEO SIGNAL PROCESSING CIRCUIT OF A VIDEO CAMERA

[75] Inventors: Michihiro Aso; Taro Watanabe; Kazuhiko Ueda, all of Yokohama, Japan

[73] Assignee: Victor Company of Japan, Ltd., Japan

[21] Appl. No.: 243,906

[22] Filed: Sep. 13, 1988

[30] Foreign Application Priority Data

Sep. 18, 1987 [JP] Japan ............................ 62-235675

[51] Int. Cl.$^5$ .............................................. H04N 9/75
[52] U.S. Cl. ........................................ 358/29; 358/44
[58] Field of Search ...................... 358/29, 44, 39, 40, 358/36

[56] References Cited

U.S. PATENT DOCUMENTS 4,638,352  1/1987  Noda et al. ........................... 358/44

FOREIGN PATENT DOCUMENTS 3619708  12/1986  Fed. Rep. of Germany .
0067790   4/1984  Japan .
0089090   5/1984  Japan .
0104290   5/1987  Japan .

Primary Examiner—James J. Groody
Assistant Examiner—David E. Harvey
Attorney, Agent, or Firm—Andrus, Sceales, Starke & Sawall

[57] ABSTRACT

A video signal processing circuit of a single chip color camera including a color separation filter for performing a color separation on incident light passing therethrough so as to output color separated light, a solid state pickup device for picking up the color separated light passed through the color separation filter and outputting a video signal, main circuit means for generating a first luminance signal, a second luminance signal, a first color difference signal, and a second color difference signal from the video signal, compensating signal generating means for obtaining a compensation signal from the first and second color difference signals, operational means for applying the compensation signal to the first luminance signal to produce as output luminance signal, and color temperature detection means for detecting a color temperature of the incident light and outputting a DC control voltage so as to determine the compensation signal.

9 Claims, 6 Drawing Sheets

VIDEO SIGNAL PROCESSING CIRCUIT OF A VIDEO CAMERA

BACKGROUND OF THE INVENTION

The present invention generally relates to a video signal processing circuit of a video camera, and more particularly relates to a video signal processing circuit of a single chip colour camera which employs a solid state pickup device such as a charge coupled device (hereinafter referred to as a CCD).

An example of the conventional video signal processing circuit of the single chip colour camera is described with reference to FIG. 7. FIG.7 shows a system block diagram of a signal processing circuit 20 of the single chip colour camera which employs the CCD. Due to incident light from a camera lens (not shown) an electric charge is generated and accumulated in a CCD image sensor 12. The accumulated electric charge is read out from the CCD image sensor 12 responsive to a horizontal driving pulse $\phi H$ and a vertical driving pulse $\phi V$. The read out accumulated charge is inputted to a sample and hold circuit 13 in a form of CCD output gate reset pulse $\phi R$ of approximately 0.6 volts p-p being superposed with a video signal of approximately 0.1 volt p-p. The sample and hold circuit 13 transforms the CCD output gate reset pulse $\phi R$ superimposed with the video signal into a continuous signal and supplies the continuous signal to an automatic gain control circuit (hereinafter referred to as an AGC circuit) 14. The AGC circuit 14 has a variable gain of 0 to 9 dB for example, and operates so that when an iris within the single chip colour camera is opened, the AGC circuit 14 adjusts the video signal input therein to a suitable level, and supplies the video signal subjected to the adjustment to low pass filters (hereinafter referred to as LPF) 15 and 16, and a band pass filter (hereinafter referred to as BPF) 17.

An explanation is now given of an operation of processing a luminance signal from the video signal. The LPF 15 has a cut-off frequency of approximately 3.2 MHz, and accordingly a luminance signal $Y_H$ is obtained by the LPF 15. In addition, a horizontal resolution of up to approximately 270 lines can be determined by the LPF 15. At a following stage, an equalizer 24 compensates a time difference between the luminance signal $Y_H$ and a colour signal which is separately processed from the video signal as described later and thus adds a time delay of approximately 0.4 $\mu$sec to the luminance signal $Y_H$. Next, a clamping circuit 25 determines a set-up value of the luminance signal, and thereafter a gamma compensation circuit 26 determines a $\gamma$ characteristic, that is a $\gamma$ value, for determining an output characteristic of the luminance signal. The $\gamma$ characteristic of the signal obtained from the CCD image sensor 12 is such that $\gamma$ is approximately equal to 1. However, the gamma compensation circuit 26 is designed to perform a compensation so as to obtain a gamma value of 0.45, and therefore compensates the luminance signal $Y_H$ output from the single chip colour camera to the gamma value of 0.45. Following the gamma compensation circuit 26, a trap circuit 31 removes a cross-talk component of a colour signal of 3.97 MHz from luminance signal $Y_H$, and thereafter supplies the luminance signal $Y_H$ to a delay circuit 32 and an operational circuit 33. A horizontal contour compensation signal for compensating a horizontal contour of the luminance signal $Y_H$ is produced through the delay circuit 32 and a differential amplifier accommodated in the operational circuit 33. The operational circuit 33 adds the contour compensation signal to the luminance signal $Y_H$ and thereafter outputs the luminance signal $Y_H$ to an adder 37. Further, a vertical contour compensation signal is produced from a luminance signal $Y_L$ which is obtained through the LPF 16 which has a cut-off frequency at approximately 0.8 MHz. The luminance signal $Y_L$ is subjected to a similar process to that described above for the luminance signal $Y_H$ with respect to a clamping circuit 34, a gamma compensation circuit 27, a delay circuit 35, and an operational circuit 36. Thus, the vertical contour compensation signal which is added to the luminance signal $Y_L$ is outputted to the adder 37.

Next, a description is given of an operation of processing the colour signal in the conventional video signal processing circuit. The video signal is supplied from the AGC circuit 14 to the BPF 17 which has a band width of 3.97+1 MHz and thereby extracts a signal from the video signal. This extracted signal is supplied to and detected by a synchronous detector (hereinafter referred to as a detector) 18 and as a result, a colour difference signal is obtained. The colour difference signal has values of 2R-G and 2B-G, where R denotes a red primary colour signal, B denotes a blue primary colour signal and G denotes a green primary colour signal. The colour difference signal alternates between the values 2R-G and 2B-G for every one scanning line and is a line sequential colour difference signal. The line sequential colour difference signal is subjected to a band limitation to 0.8 MHz in a LPF 19. Thereafter the luminance signal $Y_L$ supplied from the LPF 16 is added to the line sequential colour difference signal in an adder 21. As a result, the green signal G is cancelled out from the line sequential colour difference signal having the values 2R-G and 2B-G, so that a line sequential colour signal having values of 2R and 2B is outputted from the adder 21. Next, white balance gain control amplifiers (hereinafter referred to as a white balance GCA) 22 and 23 determine a set-up value and a white balance of the primary colour signals R and B. Thereafter, the primary colour signals R and B are subjected to a gamma compensation in respective gamma compensation circuits 28 and 29 and then are supplied to respective colour difference signal circuits (subtracting circuit) 38 and 39. The luminance signal $Y_L$ from the gamma compensation circuit 27 is supplied to both of the colour difference signal circuits 38 and 39 so that line sequential colour difference signals $R-Y_L/B-Y_L$ are produced therefrom and supplied to a sequential-to-simultaneous conversion circuit 49. The sequential-to-simultaneous conversion circuit comprises a switching circuit 41, a delay circuit 44 which delays the sequential colour difference signal by one horizontal scanning interval, and switching circuits 42 and 43. The line sequential colour difference signals $R-Y_L/B-Y_L$ are supplied to the switching circuit 41 which switches for every one scanning line and thereby obtains a continuous line sequential colour difference signal. Thereafter, two line sequential colour difference signals $R-Y_L/B-Y_L$ are formed such that one of the line sequential colour difference signals $R-Y_L/B-Y_L$ is delayed by the delay circuit 44 by one horizontal scanning interval. Next, the switching circuits 42 and 43 perform switching operations so as to convert the two line sequential colour difference signals $R-Y_L/B-Y_L$ into two colour difference signals $R-Y_L$ and $B-Y_L$ which occur simultaneously for each horizontal scanning interval of 1H. The colour difference signals R-$Y_L$ and B-$Y_L$ from the sequential-to-simultaneous conversion circuit 49 are supplied to an encoder 45 where a balanced modulation is carried out on the respective colour subcarriers with the colour difference signals R-$Y_L$ and B-$Y_L$ respectively and the balanced modulated signals are mixed together. Thus, a chroma signal is outputted from the encoder 45. In the case of the NTSC system for example, the chroma signal has a frequency of 3.58 MHz.

However, the conventional CCD single chip colour camera does not have a construction so as to compensate by electrical means an error in luminance composition, and instead performs the compensation for the error in luminance composition by an optical construction. That is, the error in luminance composition is compensated by mounting a colour temperature conversion filter (an optical filter) for compensating for a change in colour temperature in front of the camera lens.

In general, the colour camera is adjusted by taking a reference object which is illuminated with a predetermined colour temperature of 3200 K for example. However, when taking an arbitrary picked object which is illuminated by light of a different colour temperature it is necessary to adjust the colour camera in order to obtain the predetermined colour temperature. There is a method of performing the adjustment optically by mounting a colour temperature conversion filter in front of the camera lens so as to convert the different colour temperature to 3200 K. This method for adjusting the colour temperature with respect to the conventional circuit by using the optical filter is beneficial in that the error in luminance is reduced. However, the use of the optical filter results in an increased weight of the colour camera and is a hindrance to manipulate a colour camera that should be compact and light in weight.

SUMMARY OF THE INVENTION

Accordingly, it is a general object of the present invention to provide a novel and useful video signal processing circuit of a single chip colour camera in which the disadvantages of the conventional video signal processing circuit of the colour camera have been eliminated.

A more specific object of the present invention is to provide a video signal processing circuit of a single chip colour camera having a luminance error detection circuit which contains colour temperature detection means and which determines a compensation signal for compensating an error in luminance by an output signal from the colour temperature detection means.

The above objects and features of the present invention can be achieved by a video signal processing circuit of a single chip colour camera comprising a colour separation filter for performing a colour separation on incident light passing therethrough so as to output colour separated light, a solid state pickup device for outputting a video signal in response to the colour separated light passed through said colour separation filter and projected thereto, main circuit means for generating a first luminance signal, a second luminance signal, a first colour difference signal and a second colour difference signal from said video signal, compensating signal generating means for obtaining a compensation signal from said first and second colour difference signals, operational means for applying said compensation signal to said first luminance signal, and colour temperature detection means for detecting a colour temperature of the incident light and outputting a DC control voltage so as to determine said compensation signal.

Other objects, features and advantages of the present invention will become apparent from the following detailed description when read in conjunction with the accompanying drawings.

DETAILED DESCRIPTION

Figure 1:
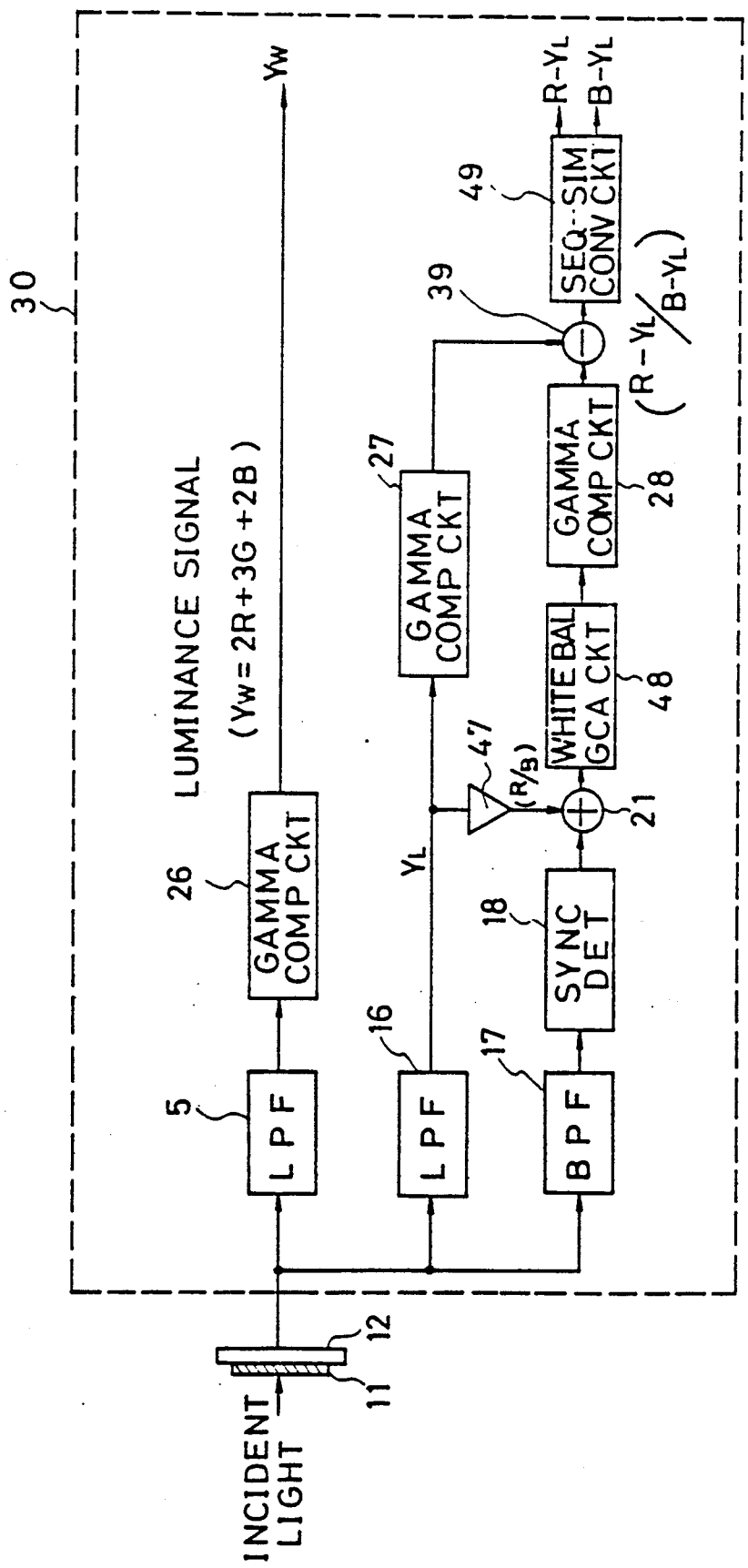
FIG. 1 is a system block diagram of a main part of a video signal processing circuit of a single chip colour camera of the present invention.
Figure 7:
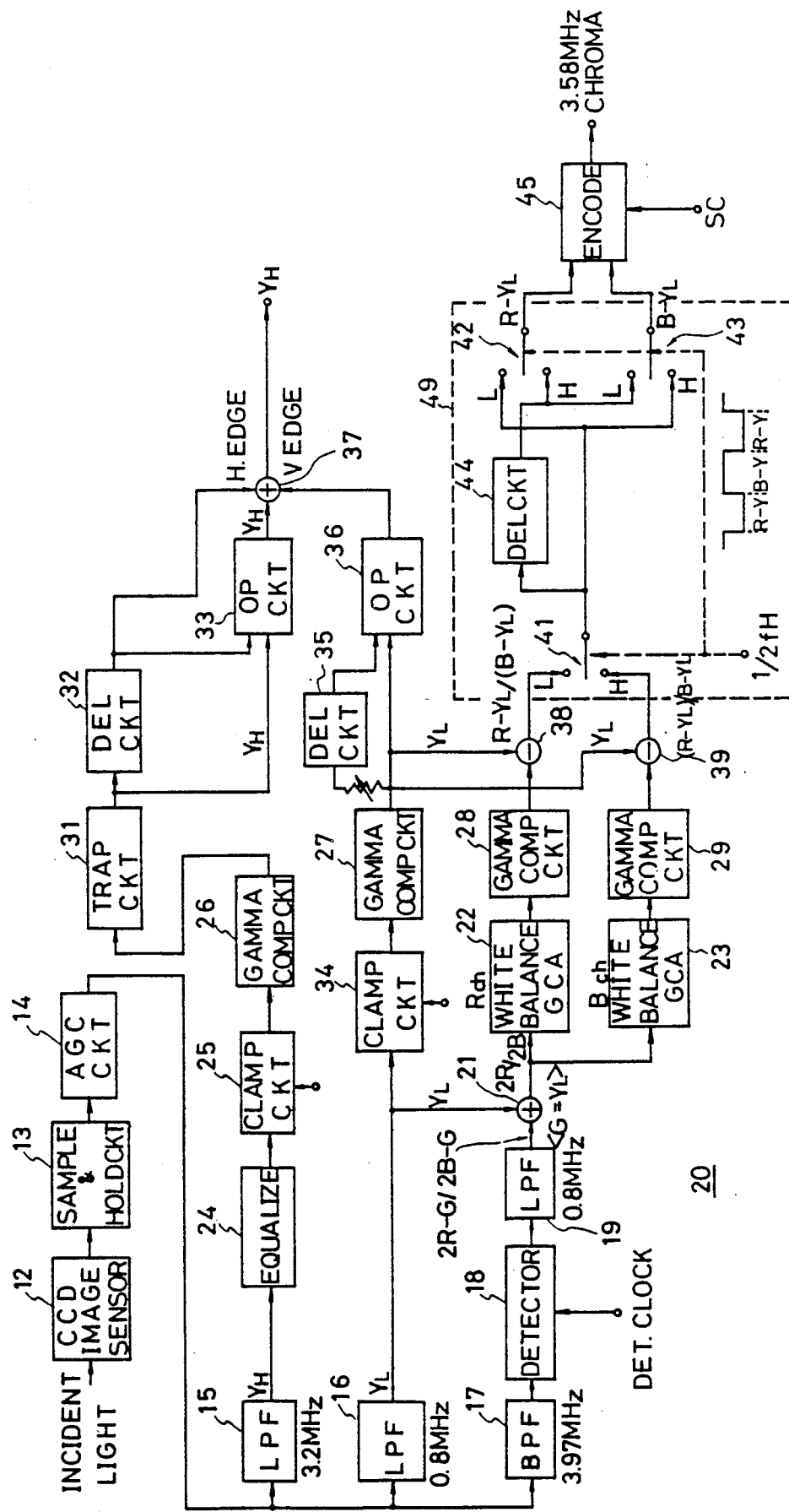
FIG. 7 is a system block diagram of the conventional signal processing circuit of the single chip colour camera.

A description is now given of an embodiment of a video signal processing circuit of a single chip colour camera of the present invention with reference to FIG. 1. FIG. 1 is a system block diagram of a main part of the video processing circuit of the single chip colour camera of the present invention. The main part comprises a colour filter 11, a CCD image sensor 12, and a main circuit 30. In FIG. 1, those parts which are the same as those parts in FIG. 7 are given the same designations and a description thereof will be omitted.

Figure 4:
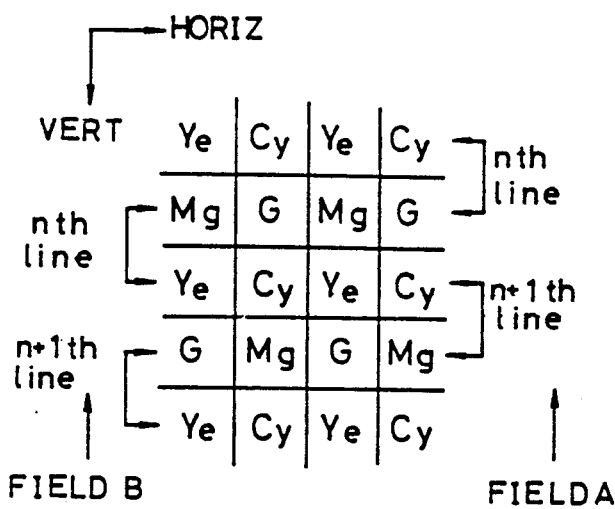
FIG. 4 is a diagram for explaining the principle of operation of an example of a colour filter for a single chip colour camera to which the present invention is applied.

First, a description is given of a single chip colour camera (hereinafter referred to as a colour camera) conforming to a complementary colour difference line sequential system. The camera conforming to this system uses only one CCD image sensor 12. The colour separation filter 11 is placed in front of the CCD image sensor 12 and performs colour separation on light passing therethrough. As shown in FIG. 4, the colour separation filter 11 is constructed by colour elements of four colours which are Mg (magenta), G (green), Ye (yellow), and Cy (cyan). The CCD image sensor 12 has a photodiode (not shown) positioned behind each of the colour elements. Due to the light of one of the colours Mg, G, Ye, and Cy that is passed through the respective colour element, accumulated charges are generated in the photodiodes. Next the video signal processing circuit performs an interlacing operation whereby the accumulated charges are read out from the photodiodes for every one field of a picture frame. In detail, as shown in FIG. 4, in a field A the video processing circuit reads an accumulation signal corresponding to the accumulated charges of two vertically adjacent picture elements in an n th line and after reading out the n th line, reads the n+1 th line. After reading out the field A in this manner, the video processing circuit reads a field B in a similar way to that for the field A. However the reading of lines in the field B is deviated from the respective lines read in the field A by one row of picture elements as shown in FIG. 4. When the video signal processing circuit reads the picture elements in a horizontal direction in FIG. 4 signals of a combination (Ye+Mg) and another combination (Cy+G) are produced alternately in the n th line, and signals of (Ye+G) and (Cy+Mg) are produced alternately in the n+1 th line.

In this manner video signal components $S_n$ and $S_{n+1}$ are outputted for each of the fields A and B from the gamma compensation circuits 26 and 27. The video signal component $S_n$ is made up of a luminance signal component and a modulated colour difference signal and is expressed as follows:

$$S_n = Y_n + C_n \sin\omega t + ....$$

where $Y_n$ denotes the luminance signal $C_n$ denotes a modulated signal component of the modulated colour difference signal, and $\omega$ denotes the angular frequency by which the colour element pairs are read The video signal component $S_n$ is similarly expressed by:

$$S_{n+1} = Y_{n+1} + C_n \sin\omega t + ....$$

Further, the luminance signal components $Y_n$ and $Y_{n+1}$ for each of the lines are expressed as follows:

$$\begin{aligned} Y_n &= (Ye + Mg) + (Cy + G) \quad (1) \\ &= [(R + G) + (R + B)] + [(B + G) + G] \\ &= 2R + 3G + 2B \end{aligned}$$

$$\begin{aligned} Y_{n+1} &= (Ye + G) + (Cy + Mg) \quad (2) \\ &= [(R + G) + G] + [(B + G) + (R + B)] \\ &= 2R + 3G + 2B \end{aligned}$$

Also, the modulated signal components $C_n$ and $C_{n-1}$ for each of the lines are expressed as follows:

$$\begin{aligned} C_n &= (Ye + Mg) - (Cy + G) \quad (3) \\ &= 2R - G \end{aligned}$$

$$\begin{aligned} C_{n+1} &= (Cy + Mg) - (Ye + G) \quad (4) \\ &= 2B - G \end{aligned}$$

Thus, it can be seen from equations (1) and (2) that the luminance signal components of the n th line and the n+1 th line are identical, and it is possible to obtain the luminance signals just by passing the luminance signal components through LPF filters 15 and 16.

However, the proportion of the primary colour components in the luminance signal differ from that of the luminance signal conforming to the NTSC system. A luminance signal Y of the NTSC system is expressed as follows:

$$Y = 0.30R + 0.59G + 0.11B \quad (5)$$

Figure 3:
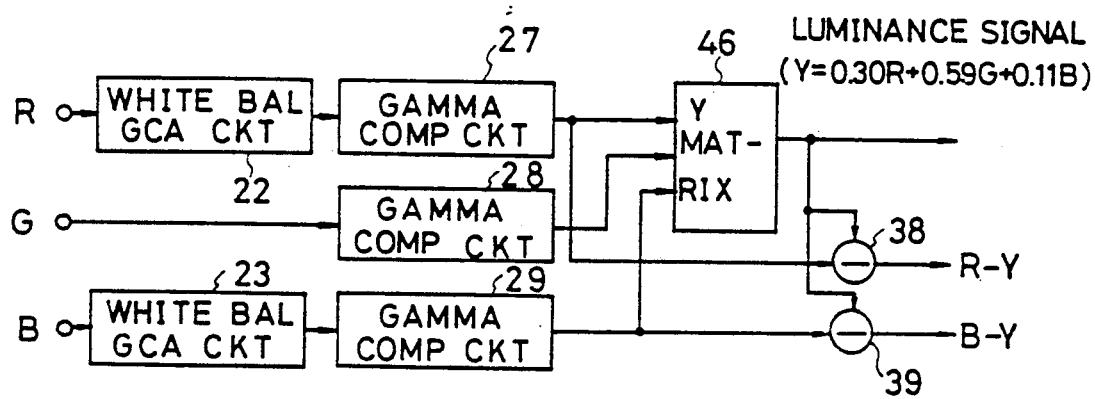
FIG. 3 is a system block diagram of an image pickup system conforming to an NTSC system.

Therefore there exists a luminance error between the luminance signal of the NTSC system and the luminance signal outputted from the respective gamma compensation circuits 26 and 27 in FIG. 1. Further, the construction of the video processing circuit of the present invention is such that it is not possible to obtain unmixed primary colour signals by the use of the colour separation filter 11 having the colour picture element array as shown in FIG. 4. Because of this, it is not possible to construct an ideal NTSC image pick-up system of the colour camera which as shown in FIG. 3 produces the luminance signal Y from the primary colour signals (components) R, G and B by a matrix circuit 46. As a result it is necessary to carry out a compensation on the luminance signals described in equations (1) and (2) in order to obtain the luminance signal Y.

A further description is now given of a construction and operation of the video signal processing circuit of a colour camera of the present invention with reference to FIG. 1 whereby the above problems are solved. A luminance signal $Y_L$ from the LPF 16 is amplified to a suitable level by an amplifier 47 and thereafter is supplied to an adder 21. The adder 21 adds a colour difference signal supplied from a synchronous detector 18 with the luminance signal $Y_L$ to thus produce primary colour signals R and B. The primary colour signals R and B are supplied to a colour difference signal circuit 39 through a white balance GCA circuit 48 and a gamma compensation circuit 28 respectively. The luminance signal $Y_L$ from the LPF 16 is also supplied to the colour difference signal circuit 39 through the gamma compensation circuit 27. Thus, the colour difference signal circuit 39 subtracts the luminance signal $Y_L$ from the primary colour signals R and B supplied thereto, and thereafter supplies the line sequential colour difference signals R-$Y_L$/B-$Y_L$ to a sequential-to-simultaneous conversion circuit 49. The sequential-to-simultaneous conversion circuit 49 converts the line sequential colour difference signals R-$Y_L$/B-$Y_L$ into the colour difference signals R-$Y_L$ and B-$Y_L$ which occur simultaneously for each horizontal scanning interval of 1H, and thus outputs the colour difference signals R-$Y_L$ and B-$Y_L$ from respective output terminals.

In the present embodiment, the white balance GCA circuit 48 in FIG. 1 corresponds to a combination of the white balance GCA circuits 22 and 23 of the conventional circuit in FIG. 7. Also, the sequential-to-simultaneous conversion circuit 49 in FIG. 1 corresponds to a combination of the switching circuits 41, 42, 43 and the delay circuit 44 in FIG. 7.

As may be understood from FIG. 1, the construction of the video processing circuit of the present invention is such that it is not possible to obtain unmixed primary colour signals by the use of the colour separation filter 11. Because of this, it is not possible to construct an ideal NTSC image pick-up system for the colour camera which as shown in FIG. 3 passes the primary colour signals R and B through respective white balance GCA circuits 22 and 23 so as to balance the levels of the primary colour signals R and B with respect to the level of the primary colour signal G for a given colour image being picked up, and passes the primary colour signals R, G, and B through respective gamma compensation circuits 27, 28, and 29 and a Y matrix 46 so as to produce the luminance signal Y which is in conformance with the NTSC system. For this reason, in the present embodiment shown in FIG. 1 it is necessary to carry out a compensation on luminance signals described in equations (1) and (2) in order to obtain the luminance signal Y described in equation (5). Further, for a complete colour image, appropriate amount of hue, saturation and luminance are required. If the luminance level is changed, then the brightness of colour processed by the circuit in FIG. 1 is changed even if the hue and the saturation remain unchanged. For example, a light blue colour has a different brightness than a dark blue colour. Therefore, because the luminance signal produced by the circuit of the present embodiment is different from the luminance signal Y in conformance with the NTSC system, it is necessary to change the brightness of the colour being processed, back to the brightness of the original colour by performing a luminance compensation.

Figure 2:
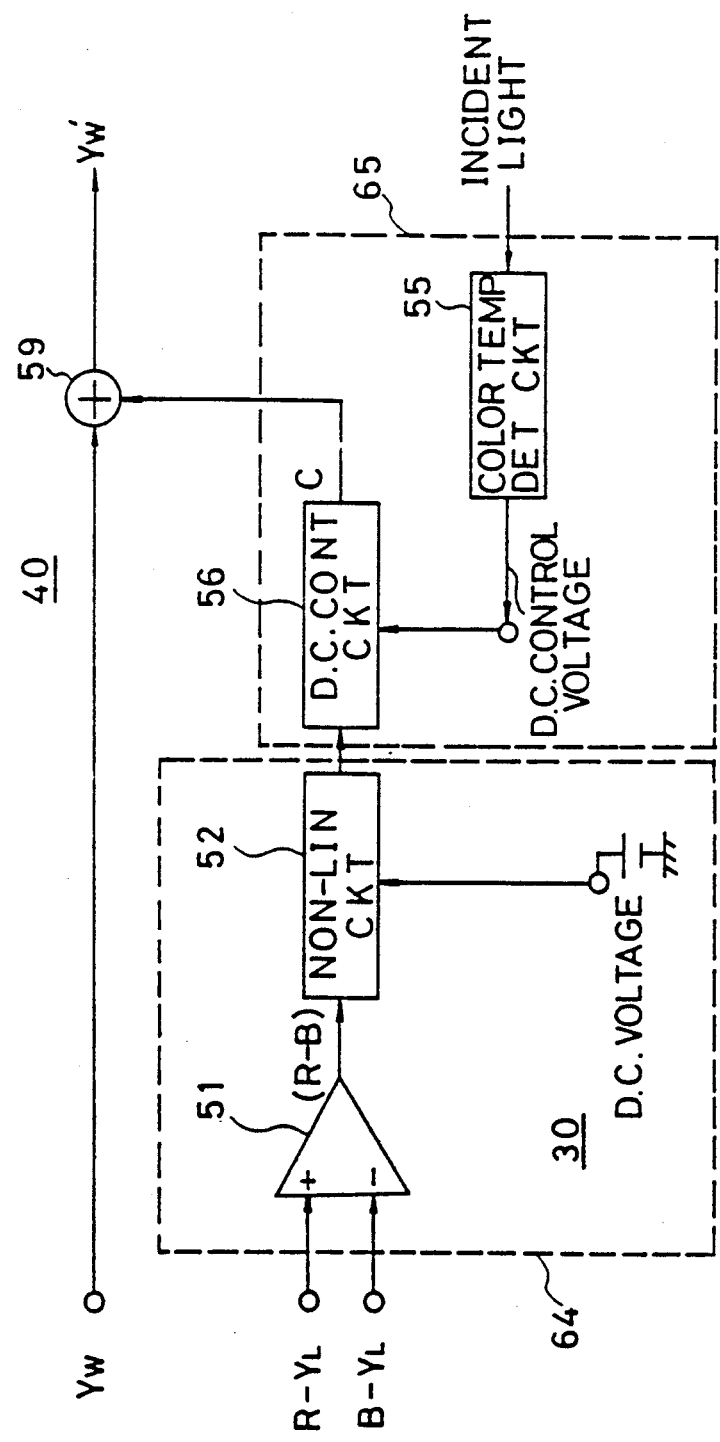
FIG. 2 is a system block diagram of a luminance error compensation circuit which constitutes the circuit of the present invention.

Next, a description is given of a luminance error compensation circuit 40 which constitutes an essential part of the present invention with reference to FIG. 2. When comparing the luminance signal described in equation (1) with the luminance signal Y conforming to the NTSC system described in equation (5), the proportion of the primary colour signal R is lower and the proportion of the primary colour B is higher than the respective proportions in the luminance signal Y. Accordingly it is necessary to perform a luminance compensation in which the proportion of the primary colour signal R is increased and the proportion of the primary colour signal B is decreased so as to obtain the proportions of the primary colour signals R, G and B shown in equation (5). The luminance compensation is performed as follows. The colour difference signals $R-Y_L$ and $B-Y_L$ are supplied from the respective output terminals of the sequential-to-simultaneous conversion circuit 49 in FIG. 1 to a subtractor 51 as shown in FIG. 2. The subtractor 51 performs the following subtraction on the colour difference signals $R-Y_L$ and $B-Y_L$:

$$(R-Y_L)-(B-Y_L)=R-B \tag{6}$$

Figure 8:
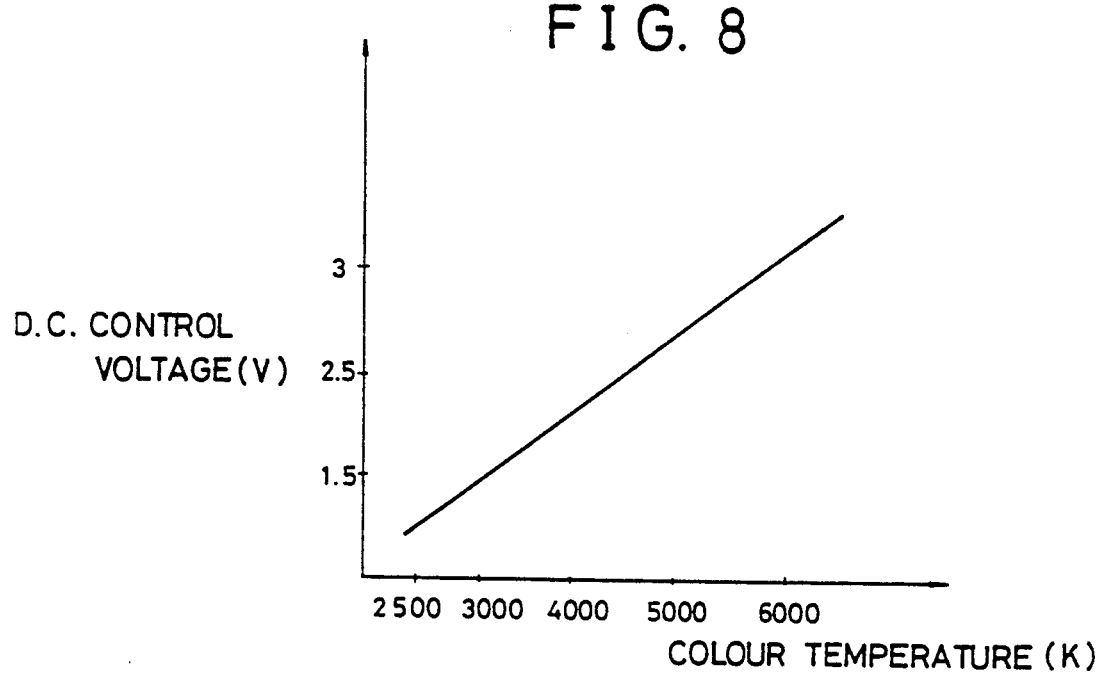
FIG. 8 is a graph showing a conversion characteristic of a colour temperature detection circuit which detects a colour temperature and outputs a DC control voltage in accordance with the colour temperature.
Figure 9:
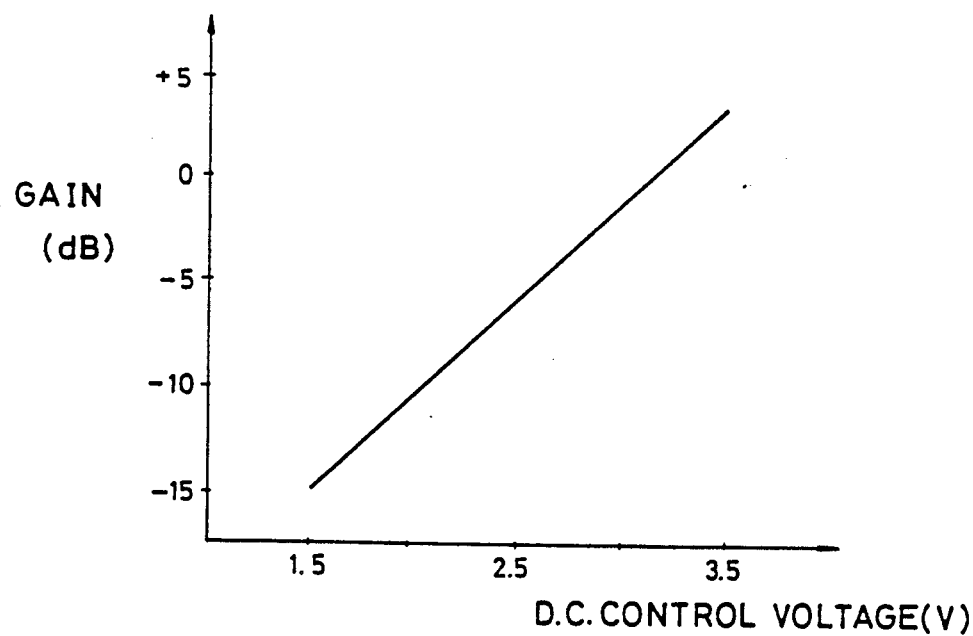
FIG. 9 is a graph showing a control characteristic of a DC control circuit which is controlled by the DC control voltage output by the colour temperature detection circuit.

Thus, the subtractor 51 supplies a difference signal R-B to a non-linear circuit 52. An output signal from the non-linear circuit 52 is supplied to an adder 59 as a compensation signal C through a known DC control circuit 56. The adder 59 adds the compensation signal C to a luminance signal $Y_w$ which is supplied from the gamma compensation circuit 26 in FIG. 1, and thus outputs a luminance signal $Y_w'$ which is expressed as follows:

$$\begin{aligned} Y_w' &= 2R + 3G + 2B + \alpha(R - B) \\ &= (2 + \alpha)R + 3G + (2 - \alpha)B \end{aligned} \tag{7}$$

where a variable $\alpha$ is a compensation amount produced by the DC control circuit 56. The DC control circuit has a control characteristic as shown in FIG. 9 such that its gain which is proportional to the variable $\alpha$ increases in proportion to an increase of a DC control voltage supplied to the DC control circuit 56 from a known colour temperature detection circuit 55. The colour temperature detection circuit 55 detects the colour temperature of the light from the object (not shown) to be picked up by the CCD image sensor 12 and produces the DC voltage based on the detected colour temperature. Thus the variable $\alpha$ is a compensation amount which is controlled by the DC control voltage from the colour temperature detection circuit 55 in accordance with a colour temperature conversion. As a result, a D.C control voltage verses colour temperature characteristic as shown in FIG. 8 is obtained regarding the colour temperature detection circuit 55. That is, as the colour temperature of the incident light detected by the colour temperature circuit 55 increases, a proportional increase occurs in the level of the D.C. control voltage supplied to the D.C. control circuit 56.

Figure 5:
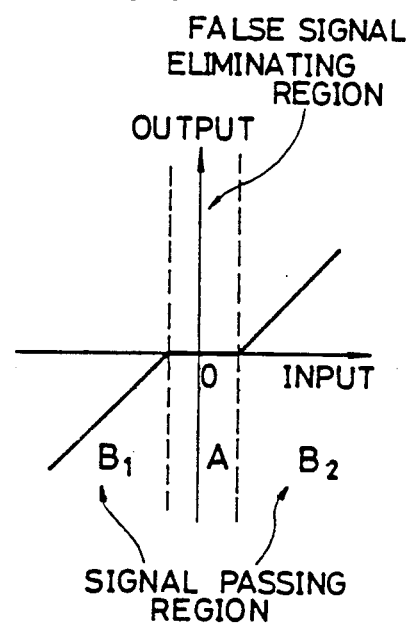
FIG. 5 is a graph showing a non-linear input/output characteristic of a non-linear circuit within the luminance error compensation circuit of the present invention.

Further, with the image pick-up system of the present invention, generation of a false colour signal may occur when picking up an achromatic colour object. If this is the case, when an output signal R-B from the subtractor 51 is added to the luminance signal $Y_w$ as it is, the false colour signal results in a false luminance signal and thus deteriorates the picture quality. Accordingly, in order to eliminate the false colour signal, the output signal R-B from the subtractor 51 is passed through the non-linear circuit 52. The non-linear circuit has an input-/output characteristic as shown in FIG. 5. In FIG. 5, a portion of the output signal R-B which is within a range defined by a false colour signal eliminating region A is eliminated from the output signal. The false colour signal eliminating region A corresponds to a clip quantity set by the non-linear circuit 52. The non-linear circuit 52 sets the clip quantity in accordance with a DC voltage applied thereto to thus eliminate the false colour colour signal from the difference signal R-B. On the other hand, portions of the difference signal R-B which have a level less than the range defined by the false colour signal eliminating region A are passed through as indicated in the difference signal passing region $B_1$ so that a negative level of an output signal increases in proportion to a negative level of the input difference signal R-B. Also, portions of the difference signal R-B which have a level greater this range are passed through as indicated in the difference signal passing region $B_2$ so that the level of the output signal increases in proportion to the level of the input difference signal R-B. Thus a signal which has not been eliminated by the set clip quantity is added to the luminance signal $Y_w$ as the compensation signal C through the DC control circuit 56.

Figure 6:
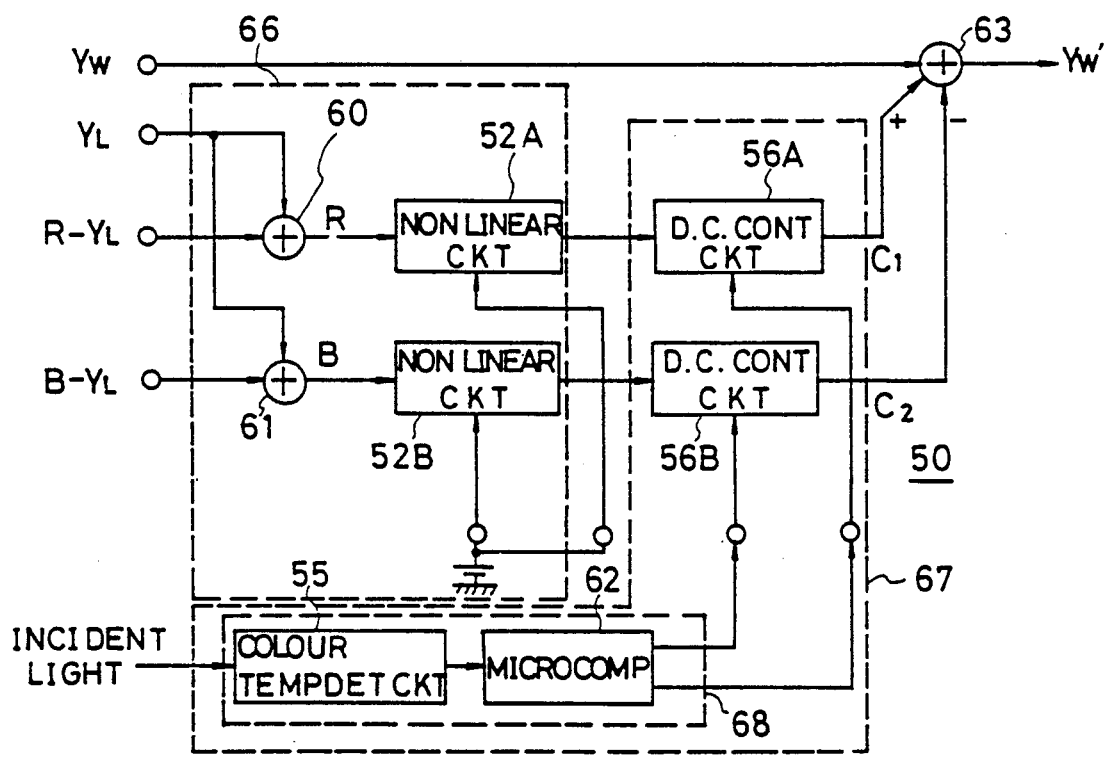
FIG. 6 is a system block diagram of a second embodiment of the circuit of the present invention.

A description will now be given of a second embodiment of the video signal processing circuit of the colour camera of the present invention with reference to FIG. 6. In FIG. 6, those portions which have the same construction as those in FIG. 2 are given the same designations and a description thereof is omitted. The circuit of the second embodiment has a characteristic such that it is possible to further increase the accuracy of the compensation. That is, in the present embodiment the construction of the detecting portion of a luminance error compensation circuit 50 is different from that of the luminance error compensating circuit 40 in FIG. 2 in that it separately detects the signals R and B which are obtained by adding the signal $Y_L$ from the gamma compensation circuit 27 of FIG. 1 to each of the signals $R-Y_L$ and $B-Y_L$ in adders 60 and 61 respectively. Thereafter the primary colour signals R and B are separately compensated in respective non-linear circuits 52A and 52B. In this manner, the degree of freedom in the compensation is increased. Further, a microcomputer 62 subjects a detection signal from the colour temperature detection circuit 55 to an analog-to-digital conversion. In response to the A/D converted detection signal, the microcomputer 62 reads out a pair of appropriate compensation values from stored data in a ROM thereof, which are predetermined in correspondence with detected various colour temperatures, then performs a digital-to-analog conversion on the compensation values, and applies the compensation values to DC control circuits 56A and 56B respectively. Thus, the microcomputer 62 can compensate each of the colour signals in accordance with the colour temperature of the object. The DC control circuits 56A and 56B output respective compensation signals $C_1$ and $C_2$ to an operational circuit 63. The operational circuit 63 adds the compensation signal $C_1$ to and subtracts the compensation signal $C_2$ from the luminance signal $Y_W$ supplied from the gamma compensation circuit 26 in FIG. 1 and thus outputs a luminance signal $Y_W'$.

As a result, the video signal processing circuit of the colour camera of the present invention is advantageous in that it is possible to decrease the size and weight of the entire camera and to realize a high performance at a low cost for the reason that the circuit arrangement of the present invention can be easily made in an integrated circuit chip.

The present invention is not limited to the embodiments described above, and various variations and modifications may be made without departing from the scope of the present invention.

What is claimed is:

1. A video signal processing circuit of a single chip color camera comprising:
    a color separation filter for performing a color separation on incident light passing therethrough so as to output color separated light;
    a solid state pickup device for outputting a video signal in response to the color separated light passed through said color separation filter and projected on said pickup device;
    main circuit means for generating a first luminance signal, a second luminance signal, a first color difference signal and a second color difference signal from said video signal; and
    a luminance error compensation means for compensating a luminance error in said first luminance signal based on a color temperature of the incident light detected thereby, said luminance error compensation means comprising false color signal suppressing means for suppressing a false color signal included in said first and second color difference signals, compensation signal generating means for detecting the color temperature of the incident light and generating, in accordance with the detected color temperature, a compensation signal output from a signal output from said false color signal suppressing means, and operational means for adding said compensation signal output to said first luminance signal to produce an output luminance signal.

2. A video signal processing circuit of a single chip colour camera as claimed in claim 1, wherein said false colour signal suppressing means comprises subtracting means for subtracting said second colour difference signal from said first colour difference signal and outputting difference signal, and a non-linear circuit for clipping the false colour signal from the difference signal supplied thereto; and said compensation signal generating means comprises a DC control circuit for applying a compensation value to the signal input from said non-linear circuit and outputting a compensation signal to said operational means, and a colour temperature detection circuit for detecting the colour temperature of the incident light and outputting a DC control voltage to said DC control circuit based on the detected colour temperature so as to determine said compensation value.

3. A video signal processing circuit as claimed in claim 1, wherein said false colour signal suppressing means removes first and second false colour signals from said first and second colour difference signals, and outputs first and second signals, wherein said compensation signal output comprises a first and second compensation signals which are generated by said compensation signal generating means from said first and second signals, and wherein said operational means adds said first and second compensation signals of the compensation signal output to said first luminance signal to produce said output luminance signal.

4. A video signal processing circuit as claimed in claim 3, wherein said false colour signal suppressing means comprises first and second adding means for adding said second luminance signal to said first and second colour difference signals respectively and producing first and second primary colour signals respectively, and first and second non-linear circuits for removing said first and second false colour signals from said first and second primary colour signals and outputting said first and second signals; wherein said compensation signal generating means comprises first and second DC control circuits for applying first and second compensation values to said first and second signals whereby said first and second false colour signals are removed from said first and second colour difference signals and said first and second compensation signals are respectively generated by said first and second DC control circuits and supplied to said operational means; and wherein said compensation signal generating means further comprises colour temperature detection means for detecting the colour temperature of the incident light and outputting first and second DC control voltages to said first and second DC control circuits based on the detected colour temperature so as to determine said first and second compensation values.

5. A video signal processing circuit as claimed in claim 4, wherein said colour temperature detection means comprises a colour temperature detection circuit for detecting the colour temperature of the incident light, and a microcomputer which is supplied with a colour temperature detection signal from said colour temperature detection circuit and outputs the first and second DC control voltages to said first and second DC control circuits in order to determine said first and second compensation values.

6. A video signal processing circuit as claimed in claim 1, wherein said main circuit means comprises a luminance signal processing portion and a colour signal processing portion; said luminance signal processing portion made up of a first low pass filter for producing said first luminance signal, a first gamma compensation circuit for performing a gamma compensation on said first luminance signal outputted from said first low pass filter and outputting said first luminance signal, a second low pass filter for producing said second luminance signal from said video signal, a second gamma compensation circuit for performing a gamma compensation on said second luminance signal outputted from second low pass filter, and an amplifier for amplifying said second luminance signal supplied from said second low pass filter; and said colour signal processing portion made up of a band pass filter which extracts a signal from said video signal, a synchronous detector which is supplied with the signal from said band pass filter and outputs of a colour difference signal, an adder for adding said second luminance signal from said amplifier to said colour difference signal and outputting first and second primary colour signals, a white balance gain control circuit for determining a white balance and a set-up value of said first and second primary colour signals, a third gamma compensation circuit for performing a gamma compensation on said first and second primary colour signals from aid white balance gain control circuit, a subtractor for subtracting said second luminance signal supplied from said second gamma compensation circuit from said first and second primary colour signals and outputting first and second line sequential colour difference signals, and a sequential-to-simultaneous conversion circuit for converting said first and second line sequential colour difference signals into first and second colour difference signals.

7. A video signal processing circuit as claimed in claim 2, wherein said non-linear circuit removes a portion of the difference signal that is less than a predetermined magnitude, and passes remainders of the difference signal which are greater than the predetermined magnitude, said colour temperature detection circuit outputs the DC control voltage with a level proportional to the detected colour temperature of the incident light, and said DC control circuit has a gain which is proportional to the DC control voltage; said compensation value being proportional to said gain.

8. A video signal processing circuit as claimed in claim 4, wherein said first and second non-linear circuits remove respective portions of the first and second primary colour signals that are less than a predetermined magnitude, and pass respective remainders of the first and second primary colour signals that are greater than the predetermined magnitude.

9. A video signal processing circuit as claimed in claim 5, wherein said colour temperature detection circuit outputs the colour temperature detection signal at a level proportional to the detected colour temperature of the incident light, and said first and second DC control circuits respectively have first and second gains which are proportional respectively to the first and second DC control voltages; said first and second compensation values being proportional respectively to said first and second gains.

* * * * *